(12) United States Patent
Chen et al.

(10) Patent No.: US 9,356,967 B2
(45) Date of Patent: May 31, 2016

(54) SECURE ON-DEMAND SUPPLY METHOD AND SYSTEM AND TRAFFIC TYPE ACQUISITION METHOD

(75) Inventors: Jianyong Chen, Shenzhen (CN); Xiaohua Chen, Shenzhen (CN); Zhaoji Lin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 8 days.

(21) Appl. No.: 14/235,926

(22) PCT Filed: May 30, 2012

(86) PCT No.: PCT/CN2012/076294
§ 371 (c)(1),
(2), (4) Date: Jan. 29, 2014

(87) PCT Pub. No.: WO2013/020409
PCT Pub. Date: Feb. 14, 2013

(65) Prior Publication Data
US 2014/0196113 A1    Jul. 10, 2014

(30) Foreign Application Priority Data
Aug. 8, 2011    (CN) .......................... 2011 1 0225650

(51) Int. Cl.
*H04L 29/06*   (2006.01)
*H04L 12/851*  (2013.01)

(52) U.S. Cl.
CPC ............ *H04L 63/20* (2013.01); *H04L 47/2408* (2013.01); *H04L 63/205* (2013.01); *H04L 63/0227* (2013.01); *H04L 63/0428* (2013.01); *H04L 63/105* (2013.01)

(58) Field of Classification Search
None
See application file for complete search history.

(56) References Cited

U.S. PATENT DOCUMENTS

| 7,292,569 | B1 * | 11/2007 | Smith | H04L 45/745 |
| | | | | 370/383 |
| 7,715,418 | B2 * | 5/2010 | Cho | H04L 12/4625 |
| | | | | 370/412 |

(Continued)

FOREIGN PATENT DOCUMENTS

| CN | 101146305 A | 3/2008 |
| CN | 101925127 A | 12/2010 |
| CN | 102025725 A | 4/2011 |

OTHER PUBLICATIONS

English Translation of the Written Opinion of the International Search Authority in international application No. PCT/CN2012/076294, mailed on Oct. 18, 2012.

(Continued)

*Primary Examiner* — Hadi Armouche
*Assistant Examiner* — Malcolm Cribbs
(74) *Attorney, Agent, or Firm* — Oppedahl Patent Law Firm LLC

(57) ABSTRACT

A secure on-demand supply method is disclosed. The method includes: a configuration parameter of a security function module is determined according to a security level set for requested traffic by a user, and/or an application scenario of a user terminal, and/or a traffic type; the security function module is configured by using the configuration parameter; and security protection is carried out on traffic data of the user. A traffic type acquisition method for protecting security of a specific user and/or traffic is disclosed. The method includes: a traffic identifier of data is acquired by using a traffic type classification function of a Quality of Service (QoS) function module, to protect the security of the specific user and/or traffic. The disclosure can provide various traffic security assurances according to security requirements of different users for different traffics.

18 Claims, 5 Drawing Sheets

(56) References Cited

U.S. PATENT DOCUMENTS

| | | | |
|---|---|---|---|
| 7,891,001 B1* | 2/2011 | Greenawalt | H04L 63/20 713/151 |
| 2003/0119484 A1 | 6/2003 | Adachi | |
| 2004/0160903 A1 | 8/2004 | Gai | |
| 2005/0135243 A1* | 6/2005 | Lee | H04L 12/66 370/229 |
| 2006/0177063 A1* | 8/2006 | Conway | H04L 63/02 380/270 |
| 2007/0022468 A1 | 1/2007 | Iijima | |
| 2007/0192447 A1 | 8/2007 | Huynh | |
| 2007/0286425 A1 | 12/2007 | Adachi | |
| 2009/0037999 A1* | 2/2009 | Anderson | H04W 28/16 726/12 |
| 2009/0175447 A1 | 7/2009 | Adachi | |
| 2009/0300350 A1 | 12/2009 | Gai | |
| 2010/0058049 A1 | 3/2010 | Fein | |
| 2010/0329462 A1 | 12/2010 | Adachi | |
| 2012/0189123 A1 | 7/2012 | Adachi | |
| 2012/0198020 A1* | 8/2012 | Parker et al. | 709/217 |
| 2012/0329384 A1* | 12/2012 | Boldyrev et al. | 455/39 |
| 2014/0307874 A1 | 10/2014 | Adachi et al. | |

OTHER PUBLICATIONS

International Search Report in international application No. PCT/CN2012/076294, mailed on Oct. 18, 2012.

Supplementary European Search Report in European application No. 12821520.9, mailed on Feb. 13, 2015.

* cited by examiner

SECURE ON-DEMAND SUPPLY METHOD AND SYSTEM AND TRAFFIC TYPE ACQUISITION METHOD

TECHNICAL FIELD

The disclosure relates to information security technologies, and in particular to a secure on-demand supply method, a secure on-demand supply system, and traffic type acquisition method.

BACKGROUND

Cloud computing has developed rapidly in recent years. The technology is increasingly mature, gradually transformed into products from an early theoretical stage and put on the market. Whether network manufacturers and operators, or communication manufacturers and infrastructure network operators, all of these show tremendous concern on the cloud computing. Cloud computing in a narrow sense refers to delivery and usage modes of Internet Technology (IT) infrastructure, meaning that the desired resources are acquired in an on-demand and easily extended way. Cloud computing in a broad sense refers to delivery and usage modes of service. A form of the service is based on a data centre having immense computing power. Various customized services are operated by the computing power provided by the data centre, and then are provided to a user through an Internet. Cloud computing service is mainly different from common network service in that it has dynamic extension characteristics and virtualization technology is widely used.

The cloud computing has the advantages of super-large scale, virtualization, security and reliability, and the like. For network operators, since the cloud computing uses dynamic resource allocation and extension technology, the operating costs and operation and maintenance costs are greatly reduced. Under the environment of cloud computing, all resources can be operated, and can be provided as service. The resources include application programs, software, platforms, processing capability, storage, networks, computing resources and other infrastructures, and the like. For users, the cloud computing makes it possible to consume services anytime and anywhere. A user can obtain IT resources required to operate traffic without heavy investment. The user can fully rent IT resources according to his own demand, just as water, electricity, and gas, acquires them and is charged on demand.

There are generally three main service modes in the cloud computing: Infrastructure as a Service (Iaas), Platform as a Service (PaaS) and Software as a Service (SaaS). However, according to the deployment pattern of service, it can be divided into private cloud, public cloud and hybrid cloud.

At present, the cloud computing is becoming a next service hotspot of providers, which advocates an on-demand supply, dynamic charging, easily extended and dynamic energy-saving regulation technology. The cloud computing will provide corresponding service for different service people and different traffic types, and transplants huge computational load to the cloud, thereby truly implementing on-demand supply of service.

On the cloud computing platform, data security is the greatest concern to users. Thus, various security protection measures on the cloud computing platform are of great importance. Security can be taken as a resource on the cloud computing platform, and security requirements for traffic on user and cloud platforms are supplied on demand. Therefore, secure on-demand supply is an important characteristic of a cloud computing platform security solution, the necessity of which is mainly reflected in the following aspects:

(1) Increasingly rich traffic causes the diversity of security requirements

Cloud computing advocates to operate large-scale computing task load on the cloud, but a client terminal can acquire corresponding data by lightweight application (e.g., web application). However, with the development of IT technology and the extension of application requirement, as well as the continuous increase of computation amount, the traffic established on the cloud tends to be diversified. In order to make better use of resources, it is necessary to establish an on-demand supply security mechanism.

On the one hand, there are different security requirements for different traffics. Using a single security mechanism cannot accommodate the requirement of traffic diversification. On the other hand, for the same traffic, traffic security requirements may be different towards different users on different occasions. For example, multimedia video traffic only needs low-level security assurance service when used in video on demand. However, when used in commercial video conference, if the asset value of transmitted information is high, high-level security assurance service is needed. Therefore, by analyzing from the perspective of traffic requirement, it is necessary for cloud computing service to provide a technical mechanism, to make specific traffic capable of selecting security assurance of appropriate level and technology. The choice can belong to the terminal or the cloud server, or can be negotiated by both parties on the basis of equality.

(2) Only the hierarchical security service can use resources effectively

For traditional application services, the way of providing service is to provide external service by using the IT infrastructure of a company or an application deployed thereon. In this way, idle resources cannot be used sufficiently, and the facilities of this service form are required to be higher than service peak, otherwise it will cause traffic loss or system paralysis. However, a traditional security solution also requires that the security mechanism needs to meet the security of the highest level traffic within the system.

On the other hand, there are different security requirements for traffics of different companies. For example, security authentication technology of online payment service is stricter than that of voice chat. Although the traffic is the same, different focus of company strategy has different deployment for security requirement. For the same network storage service, some service providers place emphasis on data integrity, some service providers place emphasis on data confidentiality, and other service providers place emphasis on transmission speed.

When the service provider moves traffic to the cloud computing platform, the difference in security requirements limits the deployment of the traffic. If high level security service is applied uniformly (for example, all of contents are encrypted by a digital signature), the rational use of computing resources will be severely restricted. The use of high level security for traffic with little information value means wasting a lot of computing resources. In this sense, it is necessary to perform proper grading treatment according to the size of information asset value. For the communication of high security requirement, the security assurance is high, and for the communication of low security requirement, the security assurance is low, thereby being capable of establishing compensation mechanism for use of resources to effectively utilize the resources. This just reflects the advantages of on-demand supply service of cloud computing platform.

(3) Different application scenarios cause different security risks, so the desired security strength is different The use of traffic under different application scenarios may be at different risks. For the application scenario of low risk, for example, when the cloud computing platform is connected by a local area network in an office place, only a low-strength security algorithm and protocol are needed to protect traffic data to achieve a higher security level. However, once connected to the scenarios, the same traffic is transferred from an office place to an open network, for example, when connected through wireless WiFi, the system needs to call a stronger security algorithm and protocol to reach the requirement of the same security level as the office place.

(4) Simple and efficient security services for users

The security services have rich connotations, including: infrastructure security service, such as encryption, authentication, non-repudiation and integrity protection; and service security service, such as online virus scanning, intrusion detection, security warning and content monitoring. Thus, a simple management tool is needed to assist the user in integrating the necessary security configuration, providing one-stop security service for the user. In addition to preventing information from being illegally acquired, it is also necessary to guard against wide security threats, such as virus attack, illegal information collection by Trojans, user cheat and other threats, so the security solution becomes increasingly complex. However, the user needs to engage in various traffics simply and effectively, so it is necessary to handle complex security service and corresponding security configuration through the network as much as possible, so as to ensure that the user can enjoy various secure traffics without professional security knowledge.

From the above descriptions, for different traffic types, the security level required by the user is different. For the same traffic type, the security levels required by different users are also different. Different application scenarios cause different security risks. At the same security level, the required security algorithm strength is also different. Therefore, it is necessary for the cloud computing security solution to adopt the on-demand supply technology, and according to different users, different traffic types and different application scenarios, corresponding security strategies are adopted to provide safe, reasonable and reliable protection to specific traffics and users. On the premise of meeting the security requirements of the user, cloud platform resources are saved to the greatest extent. At present, the thought of secure on-demand supply only stays in the theoretical stage, so there has not yet been a technical solution for reference.

SUMMARY

In view of the above, the disclosure is intended to provide a secure on-demand supply method, a secure on-demand supply system and traffic type acquisition method in a cloud platform, which are capable of protecting the security of traffic requested by a user according to the security requirement of the user.

To this end, the technical solution of the disclosure is implemented as follows.

A secure on-demand supply method includes:
a configuration parameter of a security function module is determined according to a security level set for requested traffic by a user, and/or an application scenario of a user terminal, and/or a traffic type; the security function module is configured according to the configuration parameter; and security of traffic data of the user is protected by the security function module.

Preferably, the step that a configuration parameter of a security function module is determined may include:
a security strategy is matched by using the security level and/or the application scenario of the user terminal and/or the traffic type to acquire the configuration parameter of the security function module; or
the configuration parameter of the security function module is calculated by using a preset algorithm according to the security level and/or the application scenario of the user terminal and/or the traffic type; or
a security strategy is matched by using the security level and/or the application scenario of the user terminal and/or the traffic type to acquire the configuration parameter of the security function module, the configuration parameter of the security function module is calculated by using a preset algorithm, the configuration parameters of the security function module acquired in the above two ways are combined, and the final configuration parameter of the security function module is determined.

Preferably, the step that security of traffic data of the user is protected by the security function module may include:
a traffic data package matching with a user identifier and/or a traffic identifier is acquired, and security protection is carried out on the acquired traffic data package according to the security configuration parameter.

Preferably, the way of acquiring a traffic type identifier may include:
a set traffic type identifier is acquired through a data package including the traffic type identifier; or
a type identifier set at the time of protecting Quality of Service (QoS) of the traffic is protected by a Quality of Service (QoS) function module.

Preferably, the security level may be set by a security requirement of the user for traffic information or by the user according to an asset value of the traffic information;

the application scenario may be a location of the user terminal and a type of an access network, wherein the type of the access network includes but is not limited to: a local area network, a wireless local area network, and a wireless mobile network of a Global System for Mobile Communications (GSM), a Code Division Multiple Access (CDMA) network and a Long Term Evolution (LTE) system;

the traffic type may include but is not limited to real-time traffic and non-real-time traffic; and the security function module may include but is not limited to one or more of following functions: confidentiality, integrity, authentication and flow cleaning.

A traffic type acquisition method includes: a security function module acquires a traffic type identifier set for traffic at the time of protecting QoS of the traffic, and protects security of the traffic and/or a user.

Preferably, the way of acquiring the traffic type identifier may include:
the set traffic type identifier is acquired through a data package including the traffic type identifier; or
the traffic type identifier notified by a relevant QoS function module is received.

Preferably, the step that security of the traffic and/or a user is protected may include:
a traffic data package matching with a user identifier and/or a traffic identifier is acquired, and security protection is carried out on the acquired traffic data package according to a security configuration parameter.

A secure on-demand supply system includes a security strategy parameter collection unit, a security strategy unit and a security execution unit, wherein the security strategy parameter collection unit is configured to: collect a security level parameter set by a user; and/or acquire a traffic type parameter of traffic requested by the user; and/or acquire a parameter of an application scenario of the user at the time of using the traffic, and send the collected parameter to the security strategy unit;

the security strategy unit is configured to determine a configuration parameter of a security function module according to a security level and/or an application scenario of a user terminal and/or a traffic type, and to send the determined configuration parameter of the security function module to the security execution unit; and the security execution unit is configured to configure the security function module according to the received configuration parameter of the security function module to protect security of traffic data of the user.

Preferably, the security strategy unit may be further configured to:

map the received parameter to an optimally-matched security strategy rule by a preset security strategy rule, and acquire the configuration parameter of the security function module; or calculate the configuration parameter of the security function module by a preset algorithm model according to an input parameter; or combine the configuration parameter of the security function module acquired in the above two ways, and determine the final configuration parameter of the security function module.

Preferably, the system may further include:

a QoS unit configured to set a traffic type identifier for traffic, and to carry out personalized QoS priority protection on the traffic data according to a user identifier and/or a traffic type; and the security execution unit may be further configured to acquire the traffic type identifier from the QoS unit, or the QoS unit may be further configured to send the traffic type identifier to the security execution unit.

Preferably, the security execution unit may be further configured to:

acquire a traffic data package matching with a user identifier and/or a traffic identifier, and carry out security protection on the acquired traffic data package according to the security configuration parameter, wherein the traffic data package includes the user identifier and/or the traffic identifier.

Preferably, the security level may be set by a security requirement of the user for traffic information or by the user according to an asset value of the traffic information;

the application scenario is a location of the user terminal and a type of an access network, wherein the type of the access network includes but is not limited to: a local area network, a wireless local area network, and a wireless mobile network of a GSM, a CDMA network and an LTE system;

the traffic type may include but be not limited to real-time traffic and non-real-time traffic; and the security function module may include but be not limited to one or more of following functions: confidentiality, integrity, authentication and flow cleaning.

In the disclosure, the configuration parameter of the security function module for the traffic requested by the user is determined according to the security level set by the user, and/or an application scenario of the user terminal, and/or the traffic type; the security function module is configured by using the configuration parameter; and security protection is carried out on the traffic data of the user. In this way, the disclosure can provide various traffic security assurances according to security requirements of different users for different traffics. The cloud platform of the disclosure satisfies the security requirements of various users and various traffics, provides personalized security assurances for the users, and enhances the user experience.

DETAILED DESCRIPTION

The basic thought of the disclosure is that: a traffic identifier is extracted from a traffic type; in conjunction with an application scenario, a security level set by a user is taken as an input parameter of a security strategy; and a security parameter is deduced by the security strategy to act on a security algorithm and protocol, so as to protect security of on-demand supply of traffic data.

In order to make the purposes, technical solutions and advantages of the disclosure clearer and easier to understand, the disclosure is further elaborated with reference to embodiments and the drawings.

Figure 1:
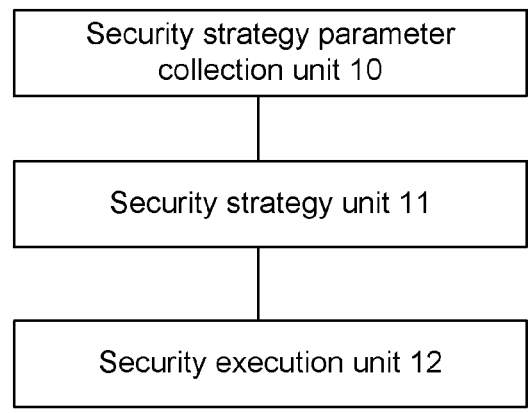
FIG. 1 is a schematic diagram of a structure of a secure on-demand supply system according to an embodiment of the disclosure.

FIG. 1 is a schematic diagram of a structure of a secure on-demand supply system according to an embodiment of the disclosure. As shown in FIG. 1, the secure on-demand supply system of the disclosure includes a security strategy parameter collection unit 10, a security strategy unit 11 and a security execution unit 12.

The security strategy parameter collection unit 10 is configured to: collect a security level parameter set by a user; and/or acquire a traffic type parameter of traffic requested by the user; and/or acquire a parameter of an application scenario of the user at the time of using the traffic, and send the collected parameter to the security strategy unit.

The security strategy unit 11 is configured to determine a configuration parameter of a security function module according to a security level and/or an application scenario of a user terminal and/or a traffic type, and to send the determined configuration parameter of the security function module to the security execution unit.

The security execution unit 12 configures a security algorithm and protocol according to the received configuration parameter of the security function module to protect security of traffic data of the user.

The security strategy unit 11 is further configured to: map the received parameter to an optimally-matched security strategy rule by a preset security strategy rule, and acquire the configuration parameter of the security function module; or calculate the configuration parameter of the security function module by a preset algorithm model according to an input parameter; or combine the configuration parameter of the security function module acquired in the above two ways, and determine the final configuration parameter of the security function module.

Figure 2:
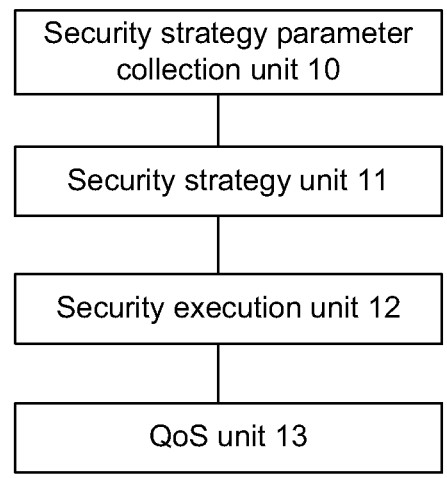
FIG. 2 is a schematic diagram of another structure of a secure on-demand supply system according to an embodiment of the disclosure.

FIG. 2 is a schematic diagram of another structure of a secure on-demand supply system according to an embodiment of the disclosure. As shown in FIG. 2, on the basis of the secure on-demand supply system as shown in FIG. 1, the system of the disclosure also includes:

a QoS unit 13 configured to set a traffic type identifier for traffic, and to carry out personalized QoS priority protection on the traffic data according to a user identifier and/or a traffic type; and the security execution unit 12 is further configured to acquire the traffic type identifier from the QoS unit, or the QoS unit is further configured to send the traffic type identifier to the security execution unit.

Other functions of each processing unit in the structure as shown in FIG. 1 or FIG. 2 will be described below.

The security execution unit 12 is further configured to:

acquire a traffic data package matching with a user identifier and/or a traffic identifier, and carry out security protection on the acquired traffic data package according to the security configuration parameter, wherein the traffic data package is generated by using the configured protocol.

The security level is set by a security requirement of the user for traffic information or by the user according to an asset value of the traffic information;

the application scenario is a location of the user terminal and a type of an access network, wherein the type of the access network includes but is not limited to: a local area network, a wireless local area network, and a wireless mobile network of a GSM, a CDMA network and an LTE system;

the traffic type includes but is not limited to real-time traffic and non-real-time traffic; and the security function module relates to but is not limited to one or more of the following processes: confidentiality, integrity, authentication and flow cleaning.

It should be appreciated by those skilled in the art that the functions of processing units related to the secure on-demand supply system of the disclosure may be implemented by a hardware circuit or by a processor executing corresponding software. The functions of each processing unit may be understood in conjunction with relevant descriptions of the above identifier allocation method.

Hereinafter, a secure on-demand supply method of the disclosure applied to a cloud platform is further illustrated in conjunction with the structure of the above secure on-demand supply system.

Figure 3:
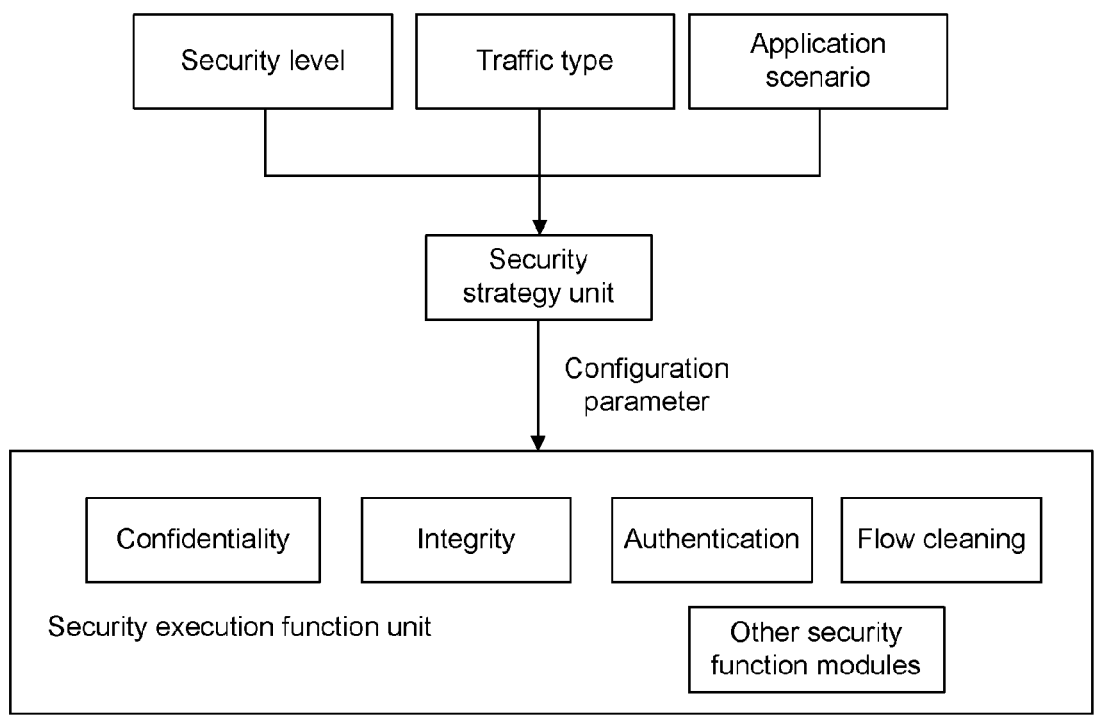
FIG. 3 is a schematic diagram of secure on-demand supply according to an embodiment of the disclosure.

FIG. 3 is a schematic diagram of secure on-demand supply according to an embodiment of the disclosure. As shown in FIG. 3, there are three kinds of parameters required to be configured: an application scenario, a traffic type and a user security level requirement. The application scenario refers to scenario information provided when a terminal is connected to a cloud platform, for example, a local area network, or a wireless network such as a 3G network, an LTE network, a CDMA network or a GSM network. The application scenario can be automatically perceived by a system according to an IP address and a location of an access point, without manual configuration. The traffic type refers to real-time traffic and non-real-time traffic. The traffic type can also be obtained through perceiving the traffic by the system. After the traffic type is perceived by the system, the system extracts a user identifier. The user security level requirement refers to that a user sets a reasonable security level according to the asset value (i.e., importance) of traffic information to be used. The security strategy unit is configured to map the collected user security level parameter, the traffic type parameter and the application scenario parameter to a best suitable security strategy rule, and obtains the security configuration parameter by the best suitable security strategy rule. The security strategy unit may also use an algorithm model and obtain an optimal security configuration parameter by calculation. The security strategy unit outputs the configuration parameter to the security execution unit. The security execution unit is mainly composed of a security algorithm or a security protocol, including security functions such as confidentiality, integrity, authentication and flow cleaning. The security execution unit provides security assurance for the traffic data.

In the disclosure, there are two kinds of security domains: a service security domain and an infrastructure security domain. Furthermore, the infrastructure security domain includes virtualization security and storage security. Since the same kind of security threat tends to need the same security function, an area with the same security threat characteristic is divided into the same security domain to contribute to achieving a secure on-demand supply mechanism. In the figure, the security strategy further outputs different combinations of security configuration parameters to a specific security domain according to security functions used by different security domains, and achieves the secure on-demand supply mechanism. For different users, according to the user security level set by the user and/or the application scenario and/or the traffic type, the security configuration parameter is output by matching the security strategy or by calculating with an algorithm model. Since data encryption transmission is a very important security function of the service security domain, the security strategy unit needs to contain parameters such as encryption algorithm selection and key length selection with respect to the security configuration parameters output by the service security domain. For the virtualization security domain, since a location is in an area controlled by a cloud computing operator, the importance of data encryption is declined. For the virtualization security, the security configuration parameter output by the security strategy needs to contain security functions such as data isolation and traffic logic validation, which are very important for virtualization security. In the disclosure, the security execution unit acquires a traffic identifier and a user identifier. The traffic data package includes the user identifier, which is technology necessary for the traffic to implement multi-tenant operation on a sharing platform. The user identifier required by the disclosure may be acquired from the traffic data directly. For the acquisition of the traffic identifier, the traffic identifier is acquired in the disclosure by making full use of the function by which the QoS unit in the cloud platform defines and processes the traffic identifier.

Figure 4:
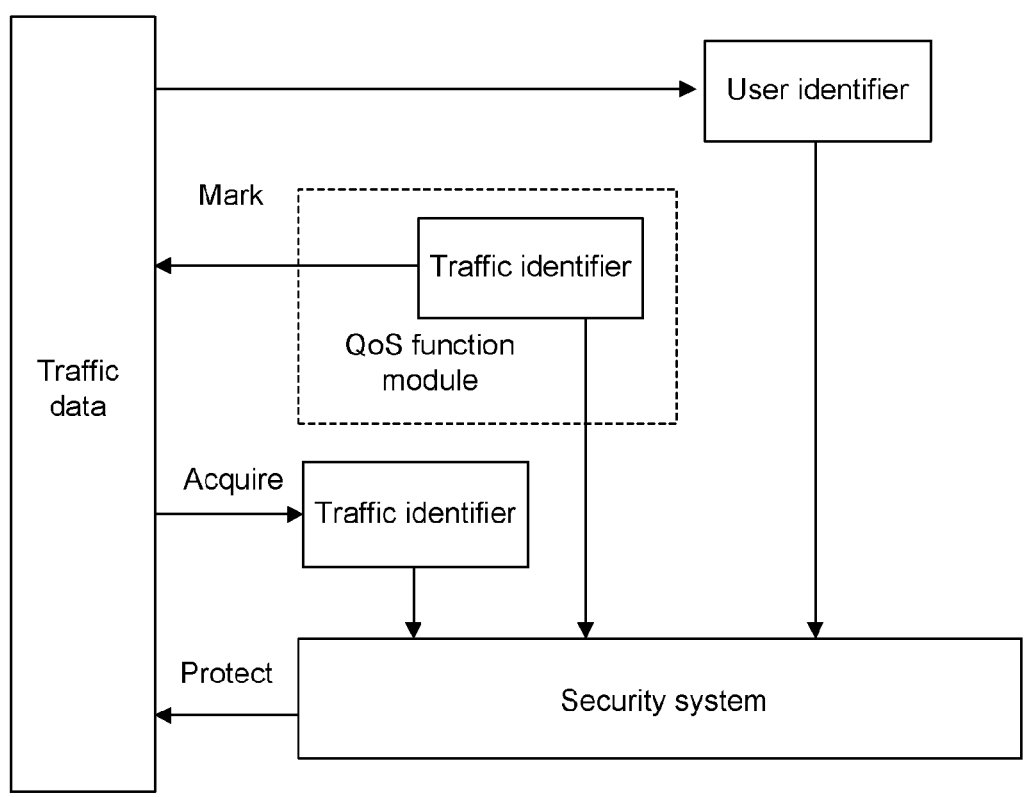
FIG. 4 is a schematic diagram showing that a security function module acquires a traffic identifier and a user identifier.

FIG. 4 is a schematic diagram showing that a security function module acquires a traffic identifier and a user identifier. As shown in FIG. 4, the cloud platform traffic data package includes the user identifier, which is technology necessary for the traffic to implement multi-tenant operation on a sharing platform. The user identifier required by the disclosure may be acquired from the traffic data directly. For the acquisition of the traffic identifier, the traffic identifier is acquired in the disclosure by making full use of the function by which the QoS unit in the cloud platform defines and processes the traffic identifier. FIG. 4 shows two acquisition ways. One of the acquisition ways is to acquire directly from a QoS function module of the cloud platform. Since the QoS function module has to embed a traffic identifier in traffic data before carrying out QoS priority protection on the specific traffic, when the QoS function module embeds the traffic identifier in the traffic data, the traffic identifier is also acquired by the security execution unit. The other acquisition way is that the security execution unit obtains the traffic identifier of the data by reading a field related to the traffic data after the QoS function module embeds the traffic identifier in the traffic data. The security execution unit can carry out on-demand supply security protection on the traffic data after obtaining the user identifier and the traffic identifier.

Figure 5:
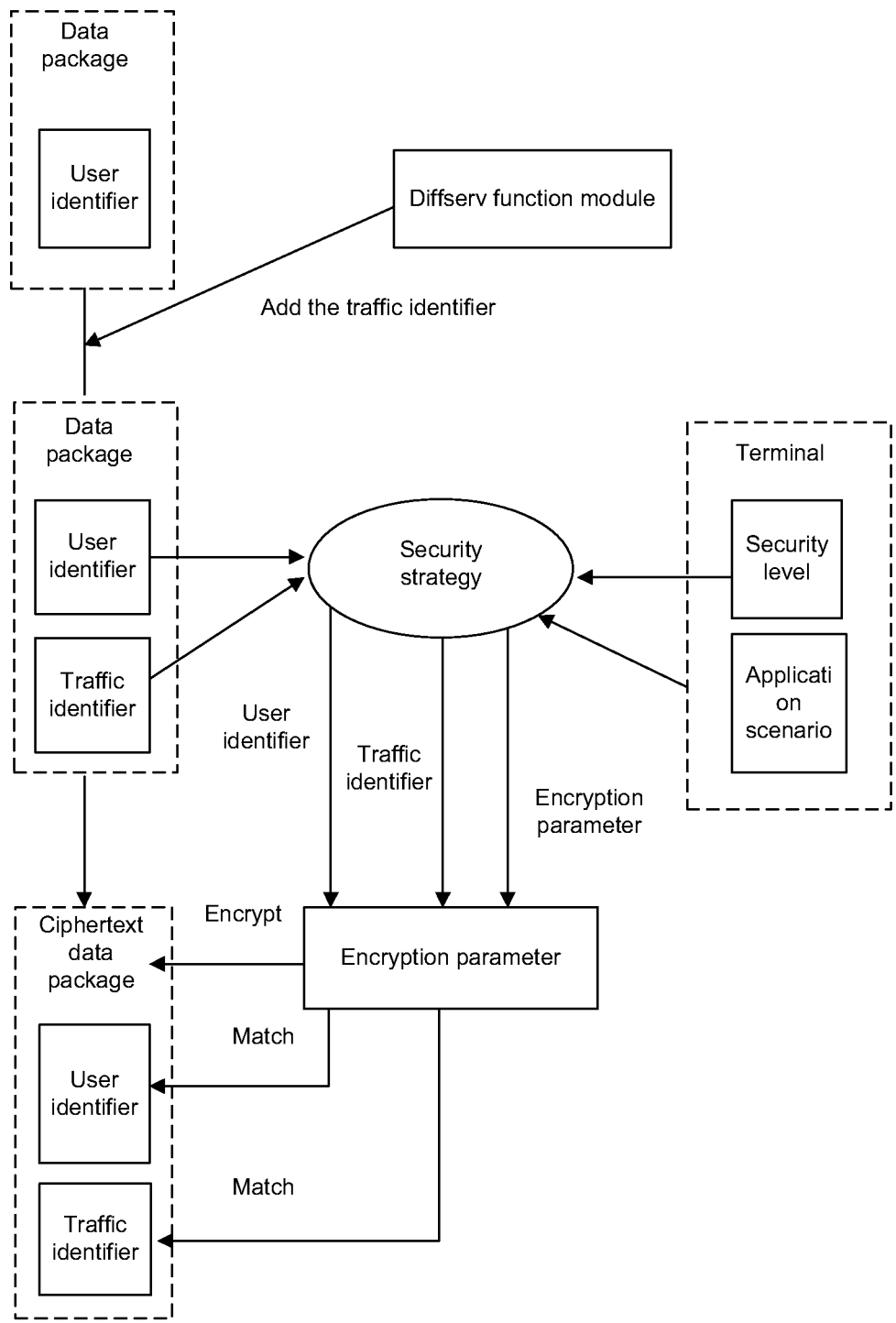
FIG. 5 is a schematic diagram of a structure of Diffserv-protocol-based and encrypted secure on-demand supply according to an embodiment of the disclosure.

FIG. 5 is a schematic diagram on a structure of Diffserv-protocol-based and encrypted secure on-demand supply according to an embodiment of the disclosure. As shown in FIG. 5, the secure on-demand supply according to the embodiment of the disclosure includes the following steps.

Step 1: A user configures relevant parameters, including an application scenario, a security level and a traffic type.

Step 2: The traffic type is defined by a traffic identifier, and the traffic identifier is implemented by a Diffsery traffic framework. By using the Diffsery traffic framework, each QoS characteristic needs to have a corresponding mapped field value in the DSCP field of the IP data header. Different field values represent different traffic granularity distinguishing identifiers, which have different traffic data transmission priorities. The higher the DSCP value is, the higher the priority of the traffic type corresponding to the DSCP value is.

Step 3: A security strategy database receives various parameter information (an application scenario parameter, a security level parameter, a user identifier and a traffic identifier).

Step 4: The security strategy database matches and maps a strategy, or calculates by an algorithm model to obtain an encryption parameter required by the traffic data, and issues the user identifier, the traffic identifier and the encryption parameter to an encryption module.

Step 5: The encryption module encrypts, through identifying, the traffic data of the specific user identifier and traffic identifier by an encryption algorithm corresponding to the encryption parameter.

It can be seen clearly from FIG. 5 that the user identifier is an important parameter necessary for implementing secure on-demand supply. However, the user identifier is mainly used for distinguishing traffic owners, and does not influence the setting of security configuration parameter as an input variable. Therefore, the user identifier is not included in input variables determining that the security strategy outputs the configuration parameter.

Figure 6:
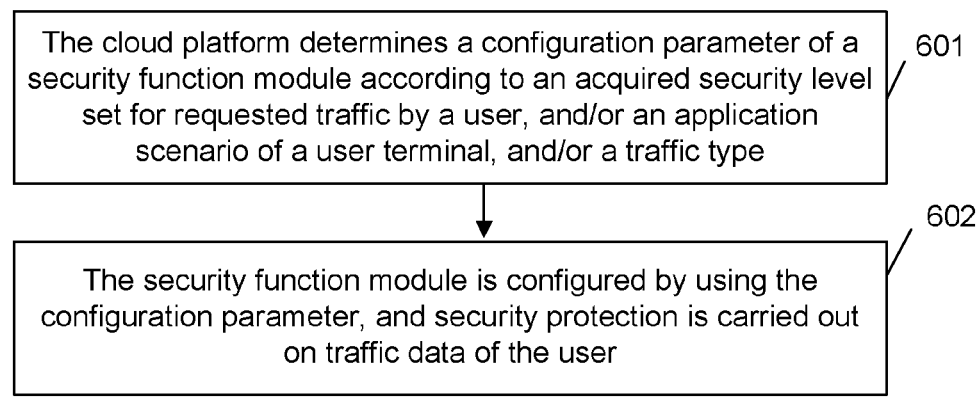
FIG. 6 is a flowchart of a secure on-demand supply method according to an embodiment of the disclosure.

FIG. 6 is a flowchart of a secure on-demand supply method in a cloud platform according to an embodiment of the disclosure. As shown in FIG. 6, the secure on-demand supply method in the cloud platform of the embodiment mainly includes the following steps.

Step 601: The cloud platform determines a configuration parameter of a security function module according to a security level set for requested traffic by a user, and/or an application scenario of a user terminal, and/or a traffic type.

Before starting the secure on-demand supply method of the disclosure, the user configures relevant parameters, for example configures the security level. Of course, the application scenario and the traffic type can also be configured directly, namely, it is unnecessary for the cloud platform to determine parameters related to the application scenario and the traffic type through acquiring traffic relevant information. When the application scenario and the traffic type are not configured, it is necessary for the cloud platform to acquire information of the application scenario and the traffic type of the user terminal. In the disclosure, the traffic type is defined by the traffic identifier, which is implemented by a Diffsery traffic framework. By using the Diffsery traffic framework, each QoS characteristic needs to have a corresponding mapped field value in the Differentiated Services Code Point (DSCP) field of the IP data header. Different field values represent different traffic granularity distinguishing identifiers, which have different traffic data transmission priorities. The higher the DSCP value is, the higher the priority of the traffic type corresponding to the DSCP value is.

In the disclosure, the process of determining the configuration parameter of the security function module includes:

a security strategy is matched by using the security level and/or the application scenario of the user terminal and/or the traffic type to acquire the configuration parameter of the security function module; or the configuration parameter of the security function module is calculated by using a preset algorithm according to the security level and/or the application scenario of the user terminal and/or the traffic type; or a security strategy is matched by using the security level and/or the application scenario of the user terminal and/or the traffic type to acquire the configuration parameter of the security function module, the configuration parameter of the security function module is calculated by using a preset algorithm, the configuration parameter of the security function module acquired in the above two ways are combined, and the final configuration parameter of the security function module is determined. Here, so-called combining includes: averaging the configuration parameters determined in the two ways, or taking the configuration parameter of the highest security level by default according to the strictest security level principle, or selecting a corresponding configuration parameter from the configuration parameters determined in the two ways according to the user requirement by taking the user requirement as a primary principle.

In the disclosure, the traffic type identifier acquisition way is as follows:

a set traffic type identifier is acquired through a data package including the traffic type identifier; or a type identifier set at the time of protecting the QoS of the traffic is protected by a QoS function module.

Step 602: The security function module is configured by using the configuration parameter, and security protection is carried out on traffic data of the user.

A traffic data package matching with a user identifier and/or a traffic identifier is acquired, and security protection is carried out on the acquired traffic data package according to the security configuration parameter. The traffic data package includes the user identifier and/or the traffic identifier.

The security level is set by a security requirement of the user for traffic information or by the user according to an asset value of the traffic information;

the application scenario is a location of the user terminal and a type of an access network, wherein the type of the access network type includes: a local area network, a wireless local area network, and a wireless mobile network of a GSM, a CDMA network and an LTE system;

the traffic type includes real-time traffic and non-real-time traffic;

the security function module relates to but is not limited to one or more of the following processes: confidentiality, integrity, authentication and flow cleaning.

In the disclosure, although the user identifier is an important parameter necessary for implementing secure on-demand supply, the user identifier is mainly used for distinguishing a service owner, and does not influence the setting of a security configuration parameter as an input variable. Therefore, the user identifier is not included in the input variables determining that the security strategy outputs the configuration parameter.

The disclosure can provide various traffic security assurances according to security requirements of different users for different traffics. The cloud platform of the disclosure satisfies the security requirements of various users and various traffics, provides personalized security assurances for the users, and enhances the user experience.

The above are only the preferred embodiments of the disclosure, and are not intended to limit the scope of protection of the claims of the disclosure.

INDUSTRIAL APPLICABILITY

In the disclosure, a configuration parameter of a security function module for traffic requested by a user is determined according to a security level set by the user, and/or an application scenario of a user terminal, and/or a traffic type. The security function module is configured by using the configuration parameter. Security protection is carried out on the traffic data of the user. Various service security assurances can be provided according to security requirements of different users for different traffics.

The invention claimed is:

1. A secure on-demand supply method, comprising:
determining a configuration parameter of a security function module according to a security level set for requested traffic by a user, an application scenario of a user terminal, and a traffic type; wherein the traffic type is defined by a traffic identifier, the traffic type identifier is set for traffic at the time of carrying out Quality of Service (QoS) priority protection on the traffic; and the traffic type identifier is implemented by a Diffserv traffic framework, by using the Diffserv traffic framework, each QoS characteristic has a corresponding mapped field value in a Differentiated Services Code Point (DSCP) field of an IP data header; wherein different field values represent different traffic granularity distinguishing identifiers, which have different traffic data transmisson priorties;
configuring the security function module according to the configuration parameter; and protecting security of traffic data of the user by the security function module.

2. The method according to claim 1, wherein the step of determining a configuration parameter of a security function module comprises:
matching a security strategy by using the security level, the application scenario of the user terminal and the traffic type, to acquire the configuration parameter of the security function module; or
calculating the configuration parameter of the security function module by using a preset algorithm according to the security level, the application scenario of the user terminal and the traffic type; or
matching a security strategy by using the security level, the application scenario of the user terminal and the traffic type, to acquire the configuration parameter of the security function module, calculating the configuration parameter of the security function module by using a preset algorithm, combining the configuration parameters of the security function module acquired in the above two ways, and determining a final configuration parameter of the security function module.

3. The method according to claim 1, wherein the step of protecting security of traffic data of the user by the security function module comprises:
acquiring a traffic data package matching with a user identifier and/or a traffic identifier, and carrying out security protection on the acquired traffic data package according to the configuration parameter.

4. The method according to claim 3, wherein the way of acquiring a traffic type identifier comprises:
acquiring a set traffic type identifier through a data package including the traffic type identifier; or
acquiring, by a QoS function module, a set type identifier.

5. The method according to claim 1, wherein the security level is set by a security requirement of the user for traffic information or by the user according to an asset value of the traffic information;
parameters of the application scenario comprise a location of the user terminal and a type of an access network, wherein the type of the access network comprises: a local area network, a wireless local area network, and a wireless mobile network of a Global System for Mobile Communications (GSM), a Code Division Multiple Access (CDMA) system and a Long Term Evolution (LTE) system;
the traffic type comprises real-time traffic and non-real-time traffic; and
the security function module comprises one or more of following functions: confidentiality, integrity, authentication and flow cleaning.

6. A traffic type acquisition method, comprising:
acquiring, by a security function module according to a security level set for requested traffic by a user, an application scenario of a user terminal, a traffic type identifier set for traffic at the time of carrying out Quality of Service (QoS) priority protection on the traffic, and protecting security of the traffic and/or a user;
wherein the step of protecting security of the traffic and/or a user comprises:
acquiring a traffic data package matching with a user identifier and/or a traffic identifier, and carrying out security protection on the acquired traffic data package according to a configuration parameter; and
wherein the traffic type identifier is implemented by a Diffserv traffic framework;
by using the Diffserv traffic framework, each QoS characteristic has a corresponding mapped field value in a Differentiated Services Code Point (DSCP) field of an IP data header;
wherein different field values represent different traffic granularity distinguishing identifiers, which have different traffic data transmission priorities.

7. The method according to claim 6, wherein the way of acquiring the traffic type identifier comprises:
acquiring the set traffic type identifier through a data package including the traffic type identifier; or
receiving the traffic type identifier, which is notified by a QoS function module.

8. The method according to claim 6, wherein the step of protecting security of the traffic and/or a user comprises:
acquiring a traffic data package matching with a user identifier and/or a traffic identifier, and carrying out security protection on the acquired traffic data package according to a configuration parameter.

9. A secure on-demand supply system, comprising
a memory storing instructions; and
a processor executing the instructions to implement a security strategy parameter collection unit, a security strategy unit and a security execution unit, wherein
the security strategy parameter collection unit is configured to: collect a security level parameter set by a user; acquire a traffic type parameter of traffic requested by the user; and acquire a parameter of an application scenario of the user at the time of using the traffic, and send the collected parameter to the security strategy unit; wherein the traffic type is defined by a traffic identifier, the traffic type identifier is set for traffic at the time of carrying out Quality of Service (QoS) priority protection on the traffic; wherein the traffic type identifier is implemented by a Diffserv traffic framework; by using the Diffserv traffic framework, each QoS characteristic has a corresponding mapped field value in a Differentiated Services Code Point (DSCP) field of an IP data header; wherein different field values represent different traffic granularity distinguishing identifiers, which have different traffic data transmission priorities;

the security strategy unit is configured to determine a configuration parameter of a security function module according to a security level, an application scenario of a user terminal and a traffic type, and to send the determined configuration parameter of the security function module to the security execution unit; and the security execution unit is configured to configure the security function module according to the received configuration parameter of the security function module to protect security of traffic data of the user.

10. The system according to claim 9, wherein the security strategy unit is further configured to:

map the received parameter to an optimally-matched security strategy rule by a preset security strategy rule, and acquire the configuration parameter of the security function module: or calculate the configuration parameter of the security function module by a preset algorithm model according to an input parameter; or combine the configuration parameter of the security function module acquired in the above two ways, and determine a final configuration parameter of the security function module.

11. The system according to claim 9, further comprising: the processor executing the instructions to implement a Quality of Service (QoS) unit configured to set a traffic type identifier for traffic, and to carry out personalized QoS priority protection on the traffic data according to a user identifier and/or a traffic type; and the security execution unit is further configured to acquire the traffic type identifier from the QoS unit, or the QoS unit is further configured to send the traffic type identifier to the security execution unit.

12. The system according to claim 11, wherein the security execution unit is further configured to:

acquire a traffic data package matching with a user identifier and/or a traffic identifier, and carry out security protection on the acquired traffic data package according to the security configuration parameter, wherein the traffic data package includes the user identifier and/or the traffic identifier.

13. The system according to claim 9, wherein the security level is set by a security requirement of the user for traffic information or by the user according to an asset value of the traffic information;

parameters of the application scenario comprise a location of the user terminal and a type of an access network, wherein the type of the access network comprises:

a local area network, a wireless local area network, and a wireless mobile network of a Global System for Mobile Communications (GSM), a Code Division Multiple Access (CDMA) system and a Long Term Evolution (LTE) system;

the traffic type comprises real-time traffic and non-real-time traffic; and the security function module comprises one or more of following functions: confidentiality, integrity, authentication and flow cleaning.

14. The method according to claim 2, wherein the step of protecting security of traffic data of the user by the security function module comprises:

acquiring a traffic data package matching with a user identifier and/or a traffic identifier, and carrying out security protection on the acquired traffic data package according to the configuration parameter.

15. The method according to claim 14, wherein the way of acquiring a traffic type identifier comprises:

acquiring a set traffic type identifier through a data package including the traffic type identifier; or acquiring, by a QoS function module, a set type identifier.

16. The method according to claim 7, wherein the step of protecting security of the traffic and/or a user comprises:

acquiring a traffic data package matching with a user identifier and/or a traffic identifier, and carrying out security protection on the acquired traffic data package according to a configuration parameter.

17. The system according to claim 10, further comprising: the processor executing the instructions to implement a Quality of Service (QoS) unit configured to set a traffic type identifier for traffic, and to carry out personalized QoS priority protection on the traffic data according to a user identifier and/or a traffic type; and the security execution unit is further configured to acquire the traffic type identifier from the QoS unit, or the QoS unit is further configured to send the traffic type identifier to the security execution unit.

18. The system according to claim 17, wherein the security execution unit is further configured to:

acquire a traffic data package matching with a user identifier and/or a traffic identifier, and carry out security protection on the acquired traffic data package according to the security configuration parameter, wherein the traffic data package includes the user identifier and/or the traffic identifier.

* * * * *